US012516363B2

(12) United States Patent
Kuchimanchi et al.

(10) Patent No.: US 12,516,363 B2
(45) Date of Patent: Jan. 6, 2026

(54) PRODUCTION OF NATURAL ORGANIC GLUCONATES

(71) Applicants: Venkata Satya Sarveswara Sairam Kuchimanchi, Secunderabad (IN); Vaishnavi Kuchimanchi, Secunderabad (IN)

(72) Inventors: Venkata Satya Sarveswara Sairam Kuchimanchi, Secunderabad (IN); Vaishnavi Kuchimanchi, Secunderabad (IN)

(*) Notice: Subject to any disclaimer, the term of this patent is extended or adjusted under 35 U.S.C. 154(b) by 728 days.

(21) Appl. No.: 17/432,630

(22) PCT Filed: Jun. 8, 2020

(86) PCT No.: PCT/IN2020/050507
§ 371 (c)(1),
(2) Date: Aug. 20, 2021

(87) PCT Pub. No.: WO2021/001844
PCT Pub. Date: Jan. 7, 2021

(65) Prior Publication Data
US 2022/0170064 A1  Jun. 2, 2022

(30) Foreign Application Priority Data
Jul. 4, 2019  (IN) .............................. 201941026892

(51) Int. Cl.
*C12P 39/00* (2006.01)
*C12P 7/58* (2006.01)
(Continued)

(52) U.S. Cl.
CPC ................. *C12P 39/00* (2013.01); *C12P 7/58* (2013.01); *C12P 19/02* (2013.01); *C12P 19/16* (2013.01)

(58) Field of Classification Search
CPC .. C12P 39/00; C12P 7/58; C12P 19/02; C12P 19/16
See application file for complete search history.

(56) References Cited

FOREIGN PATENT DOCUMENTS

EP      0062027 B1     10/1982
PL      162429 B1  *  12/1993

OTHER PUBLICATIONS

National Organic Standards Board; https://ota.com/advocacy/organic-standards/national-organic-standards-board; accessed 4/25/ 2024 (Year: 2024).*

(Continued)

*Primary Examiner* — Louise W Humphrey
*Assistant Examiner* — Candice Lee Swift
(74) *Attorney, Agent, or Firm* — Hamilton, Brook, Smith & Reynolds, P.C.

(57) ABSTRACT

The present invention discloses the conversion of non-edible grade organic maize or wheat into monosaccharides by enzyme hydrolysis. The generated glucose at 14-16% is used to produce natural, organic gluconic acid by microbial fermentation of three strains *Aspergillus niger* NCIM 545, *Penicillium notatum* NCIM 745 and *Penicillium chrysogenum* NCIM 709. These strains are improved by unique media constituents and parameters for product yield enhancement along with the reduced time of gluconic acid production by 15-20 h. Further, gluconic acid is fortified with calcium or sodium or magnesium or ferrous to produce respective gluconate salts which were processed by a set of downstream processes including spray drying to obtain in powder form. These organic gluconates have immense applications in food, pharma, feed, and construction sectors for supplying organic source as well as minerals. This route (Continued)

of gluconic acid and its salts production is robust simple, cost-effective and less time taking by using eco-friendly biotechnological processes.

11 Claims, 2 Drawing Sheets

(51) Int. Cl.
C12P 19/02 (2006.01)
C12P 19/16 (2006.01)

(56) References Cited

OTHER PUBLICATIONS

Anastassiadis, Savas, and Igor G. Morgunov. "Gluconic acid production." Recent patents on biotechnology 1.2 (2007): 167-180. (Year: 2007).*

Tarleton, E.S., 1998. Pressure leaf filter control and the prediction of performance. IN: World Congress on Particle Technology 3 : a four-day symposium incorporating the 3rd biennial particle technology forum of the AIChE held at the Brighton Centre, UK, Jul. 6-9, 1998. Rugby, UK : Institution (Year: 1998).*

Raveendran Sindhu et al. 3.12 - Enzyme Technology in Food Processing: Recent Developments and Future Prospects, Editor(s): Kai Knoerzer, Kasiviswanathan Muthukumarappan, Innovative Food Processing Technologies, Elsevier, 2021 (Year: 2021).*

Hall, Tim. "Corn Stover as an Emergency Feed Source and the Potential for a Supplemental PAN Allowance For Small Grain Sown After Stover Removal". North Carolina Department of Agriculture & Consumer Services. Aug. 27, 2007 (Year: 2007).*

Francois, Jean Marie. "A simple method for quantitative determination of polysaccharides in fungal cell walls." Nature Protocols 1.6 (2006): 2995-3000. (Year: 2006).*

Karpe, Avinash Vasant. "Biodegradation of winery biomass wastes by developing a symbiotic multi-fungal consortium." Swinburne University of Technology (2015). (Year: 2015).*

UCSD Autoclave Overview; https://blink.ucsd.edu/safety/research-lab/biosafety/autoclave/index.html#:~:text=Operating%20procedures,%E2%80%94usually%2030%E2%80%9360%20minutes.; accessed Apr. 30, 2024 (Year: 2009).*

ICSC: 1135 ; ttps://chemicalsafety.ilo.org/dyn/icsc/showcard.display?p_version=2&p_card_id=1135; accessed May 1, 2024 (Year: 2004 ).*

ICSC: 0360; https://chemicalsafety.ilo.org/dyn/icsc/showcard.display?p_version=2&p_card_id=0360; accessed May 1, 2024 (Year: 2010).*

Murugesan, Ramesh, and Valerie Orsat. "Spray drying for the production of nutraceutical ingredients—a review." Food and Bioprocess Technology 5 (2012): 3-14. (Year: 2012).*

Britannica nitrocellulose; https://www.britannica.com/science/nitrocellulose; accessed May 1, 2024 (Year: 2024).*

Yu, Jianming, et al. "Process integration for ethanol production from corn and corn stover as mixed substrates." Bioresource technology 279 (2019): 10-16. (Year: 2019).*

Kansas Farm Food Connection; https://kansasfarmfoodconnection.org/spotlights/what-are-the-different-types-of-corn#:~:text=Dent%20Corn,is%20grown%20for%20other%20purposes.; reference V on p. 4 of the PTO-892) (Year: 2019).*

Taha, Mohamed, et al. "Commercial feasibility of lignocellulose biodegradation: possibilities and challenges." Current Opinion in Biotechnology 38 (2016): 190-197. (Year: 2016).*

NCIM PDF Catalogue of Fungi; https://www.ncl-india.org/files/NCIM/Downloads/NCIM04-Fungi.pdf; accessed Aug. 7, 2024 (Year: 2014).*

Coulthard, C. E., et al. "Notatin: an anti-bacterial glucose-aerodehydrogenase from Penicillium notatum Westling." Nature 150.3813 (1942): 634-635. (Year: 1942).*

Chemistry LibreTexts; https://chem.libretexts.org/Bookshelves/Organic_Chemistry/Map%3A_Organic_Chemistry_(Smith)/05%3A_Stereochemistry/5.01%3A_Starch_and_Cellulose; accessed Aug. 8, 2024 (Year: 2024).*

Shah et al. (Biotechnology Letters vol. 15 No. 1 (Jan. 1993) pp. 35-40 (Year: 1993).*

Matsui et al. (J Microb Biochem Technol (2013): 088-091). (Year: 2013).*

Plank; https://bitesizebio.com/6128/doesnt-play-well-with-others-the-chemistry-of-the-autoclave/#:~: text=The%20extent%20with%20which%20this,containing%20solutions%2C%20if%20at%20all.; accessed Dec. 23, 2024 (Year: 2016).*

Ramachandran et al. (Current developments in biotechnology and bioengineering. Elsevier, 2017. 577-599 (Year: 2017).*

Britannica; https://www.britannica.com/topic/cornstarch; accessed Dec. 20, 2024 (Year: 2024).*

Brenda; https://www.brenda-enzymes.org/enzyme.php?ecno=3.2.1.3; accessed 12/19/2924 (Year: 2024).*

Sakurai, Hiroshi, et al. "Gluconic acid production at high concentrations by Aspergillus niger immobilized on a nonwoven fabric." Journal of fermentation and bioengineering 67.6 (1989): 404-408. (Year: 1989).*

Guo, Wenzhu, et al. "Synergistic effects of multiple enzymes from industrial Aspergillus niger strain O1 on starch saccharification." Biotechnology for Biofuels 14 (2021): 1-12. (Year: 2021).*

Abendrot, M., et al., "Zinc-containing compounds for personal care applications", International Journal of Cosmetic Science, 2018, 40, pp. 319-327.

Adhikari, U., et al., "Magnesium incorporated chitosan based scaffolds for tissue engineering applications", Bioactive Materials 1 (2016) 132-139.

Carvalho Alf, et al., "The influence of zinc gluconate as an intercalating agent on the structural, thermal, morphologic, and molecular mobility of lamellar nanofiller", 296, 1079-1086 (2018).—Abstract Only.

Chiang A, et al., (2012) Chemical Skin Burns. In: Rustemeyer T., Elsner P., John SM., Maibach H.I. (eds) Kanerva's Occupational Dermatology. Springer, Berlin, Heidelberg.—Abstract Only.

Humbert P et al., "Calcium gluconate as cross-linker improves survival and shelf life of encapsulated and dried Metarhizium brunneum and Saccharomyces cerevisiae for the application as biological control agents", Journal of Microencapsulation, Feb. 2017, 34(1)1, pp. 47-56.—Abstract Only.

Ivušić F, et al., "Synergistic inhibition of carbon steel corrosion in seawater by cerium chloride and sodium gluconate", Corrosion Science, (2015) vol. 98, pp. 88-97.—Abstract Only.

Notification of Transmittal of The International Search Report and The Written Opinion of the International Searching Authority, or the Declaration for International Application No. PCT/IN2020/050507, "Production of Natural Organic Gluconates" date of mailing: Sep. 18, 2020.

Pal, P., "Manufacture of gluconic acid: a review towards process intensification for green production." Chemical Engineering and Processing: Process Intensification 104 (2016): 160-171.

Ramachandran S, Nair S, Larroche C (2017) "Gluconic acid. In: Current developments in biotechnology and bioengineering", Current Developments in Biotechnology and Bioengineering, Amsterdam, pp. 577-599.

Sterns, R.H., et al., "Treatment of hyperkalemia: something old, something new", Kidney International (2016) 89, pp. 546-554.

Xiong, J., et al., "Porous graphite: a facile synthesis from ferrous gluconate and excellent performance as anode electrocatalyst of microbial fuel cell", Biosensors and Bioelectronic, vol. 109, Jun. 30, 2018, pp. 116-122.—Abstract Only.

Zhang, H., et al., "High titer gluconic acid fermentation by Aspergillus niger from dry dilute acid pretreated corn stover without detoxification." Bioresource technology 203 (2016) : 211-219.

* cited by examiner

PRODUCTION OF NATURAL ORGANIC GLUCONATES

This application is the U.S. National Stage of International Application No. PCT/IN2020/050507, filed Jun. 8, 2020, which designates the U.S., published in English, and claims priority under 35 U.S.C. § 119 or 365 (c) to Indian application Ser. No. 20/194,1026892, filed Jul. 4, 2019. The entire teachings of the above applications are incorporated herein by reference.

FIELD OF THE INVENTION

The present invention deals with the natural organic gluconic acids and its salts production through the biological fermentation technology. These are used in the food and pharmaceuticals as excipients which can reduce the capillary permeability and maintains the muscle excitability. In the food industry, these can be used as additives to treat the deficiency syndromes of respective minerals. Apart gluconates have applications in textile, dairy and construction sectors. The natural organic gluconates are safe to use in any condition along with the bio-available nutritional value addition of different minerals.

BACKGROUND OF THE INVENTION

Gluconic acid and its salts are well-known for its wide range of applications in pharma, food, textile, dairy and construction sectors (Pal et al., 2016). Gluconic acid with its high water solubility can able to form metal complexes in food which will enhance the flavor along with acting as an acidity regulator. As an additive in cement mixture while doing construction it will improve the strength and water resistance capacity of the building. Apart from these applications gluconic acid also functions as a gentle cleaning agent of metals including heavy metals.

The patent no. EP0062027B1 deals with cleavage of cellulose material and purification steps through the enzyme cellulase to obtain the monosaccharide material. The present invention mainly deals with the formation of glucose liquid from the natural grains. One of the embodiment of the present invention mainly deals with the process of producing natural organic gluconates by way of fermentation technology.

Gluconic acid is generally synthesized through chemical oxidation or electrolytic oxidation of glucose or through the natural biological fermentation process. Many fungi and bacteria were reported for the synthesis of gluconic acid to a different extent. *Aspergillus niger* was the first reported fungi out of *Aspergillus, Endomycopsis, Penicillium, Pillularia* and *Scopulariopsis* fungal strains. Bacterial species like *Pseudomonas, Gluconobacter, Acinetobacter, Acetobacter, Enterobacter, Micrococcus,* and *Moraxella,* etc. are also used in the gluconic acid synthesis (Pal et al., 2016). However, a consortium of these microbes might yield a higher amount of gluconic acid. Ramachandran et al., (2017) also reported the production of small amounts of gluconic acid by a yeast-like fungal culture, *Aureobasidium pullulans*.

The salts of gluconic acid are referred to as gluconates. These are produced by the reaction of an anionic gluconic ion with respective cationic mineral. Calcium gluconate is well known out of all gluconates for the bio-available calcium supplementation that is required for the body bones formation and maintenance. It is used as a medication to treat the conditions like osteoporosis, low blood calcium levels, rickets and as a supplement for a pregnant woman Further, calcium gluconate is used to treat acid burns (Chiang et al., 2012) and high potassium blood levels (Sterns et al., 2016). The cross-linker role of calcium gluconate was also reported by Humbert et al., (2017) to improve the shelf-life of encapsulated biological control agents.

Sodium gluconate has been widely used as heavy metals cleaning agent, cement retarder in constructions and sequestering agent in the textile industry. Recently, sodium gluconate was reported for its eco-friendly corrosion inhibition property for steel in seawater, which is one of the biggest hurdles for carbon steels in the saline environment (Ivusic et al., 2015). Another side, ferrous gluconate is known to use in porous graphite development, which will be used as an anionic electrode in microbial fuel cells for the generation of electricity (Xiong et al., 2018). Magnesium gluconate is used in the preparation of a polymer (chitosan) based scaffold for biomedical and tissue engineering applications (Adhikari et al., 2016).

Gluconates of potassium, zinc, manganese, etc., are also known for a wide range of applications. For example, Zinc gluconate had well known cold controlling ability. Thus it is widely used in cold medication and also for fast wound healing purpose (Ivusic et al., 2015). It was also showed that zinc gluconate had antimicrobial function against various microbes like *Propionibacterium acnes, Aspergillus brasiliensis, Escherichia coli* and *Candida albicans* with function to control acne growth and inflammation (Abendrot and Kalinowska-Li, 2018). Additionally, intercalation of zinc gluconate into lamellae of zirconium phosphate will enhance the efficiency of controlled drug delivery function of zirconium phosphate (Carvalho et al., 2018).

Therefore gluconic acid and its mineral salts have various applications in different sectors. Production of gluconic acid by chemical and electrochemical methods causes environmental toxicity and high cost respectively. In this scenario, fermentative production can be an environmentally friendly natural approach along with the low cost. However, continuous fermentative production of gluconic acid by *A. niger* is not possible due to the accumulation of high fungal mat. Hence regular cleaning of the system is mandatory. Thus efficient consortia to prolong the time of fermentation for complete utilization of media sources provided along with enhanced yield production of gluconic acid is mandatory. This route of gluconic acid and its salts production is robust simple, cost-effective and less time taking by using eco-friendly biotechnological processes.

SUMMARY OF THE INVENTION

The present invention discloses the conversion of non-edible grade organic maize or wheat into monosaccharides by enzymatic hydrolysis, further their conversion to organic gluconic acid by microbial fermentation and subsequent methodology for fortification with different minerals like calcium, sodium, magnesium, and the iron to produce different natural organic gluconate salts was disclosed.

In one of the embodiment, the present invention relates to the "Production of Natural Organic Gluconates" by eco-friendly fermentation approach wherein carbohydrate sources obtained from enzymatic hydrolysis of non-edible grade organic maize or wheat with α-amylase and glucosidase. A microbial consortium of *Aspergillus* sp. and *Penicillium* spp. was developed for higher gluconic acid production with lower fermentation time.

Another embodiment of the present invention includes that the microbial consortia comprising of three lab-adapted strains *Aspergillus niger* NCIM 545, *Penicillium notatum* NCIM 745 and *Penicillium chrysogenum* NCIM 709 which were modified by way of strain improvement through media optimization experiments for product yield enhancement at the 'in house R&D section' of Prathista Industries Limited. These fungal cultures were initially obtained from National Collection for Industrially Important Microorganisms (NCIM), at National Chemical Laboratory, Pune and were further modified by way of strain improvement methods.

Another embodiment of the present invention relates to the main glucose source (14-16%) used in media for fermentation is naturally originated from organically grown plant sources like Maize and Wheat. The fermentation process was optimized with different media constituents and controlling parameters. The upstream process was completed when reducing sugars completely exhausted in the fermenter. The downstream process includes the leaf filtration of culture media for obtaining the liquid gluconic acid with 14-16% concentration.

In another embodiment of the present invention the fortification of liquid gluconic acid with 25-50% $Ca(OH)_2$/$CaCO_3$ slurry for calcium gluconate or 25-50% of $Na_2CO_3$ slurry for sodium gluconate or 25-50% of $MgO$/$MgCO_3$ for magnesium gluconate or 25-50% of $FeO$/$FeCO_3$ for ferrous gluconate is disclosed. Downstream progression includes the evaporation and spray drying to obtain the desired concentration of natural organic gluconate salts in the powder form. This is a more acceptable and easy way to get the powder form of the organic gluconates by way of drying at 200° C. This is a sophisticated and improved process to enhance the yield of gluconate salts, decrease the time of production and improve the quality of the final product.

The process of the present invention is a robust, simple and cost-effective in the production of gluconic acid and its salts by using biotechnological processes. These are having a wide range of applications in pharma, food, textile, dairy, and construction sectors. Further in biomedical applications, gluconates are becoming a trending source for releasing required mineral or drug in a controlled manner. They are part of scaffolds development that are used in tissue engineering.

DETAILED DESCRIPTION OF THE INVENTION

Figure 1:
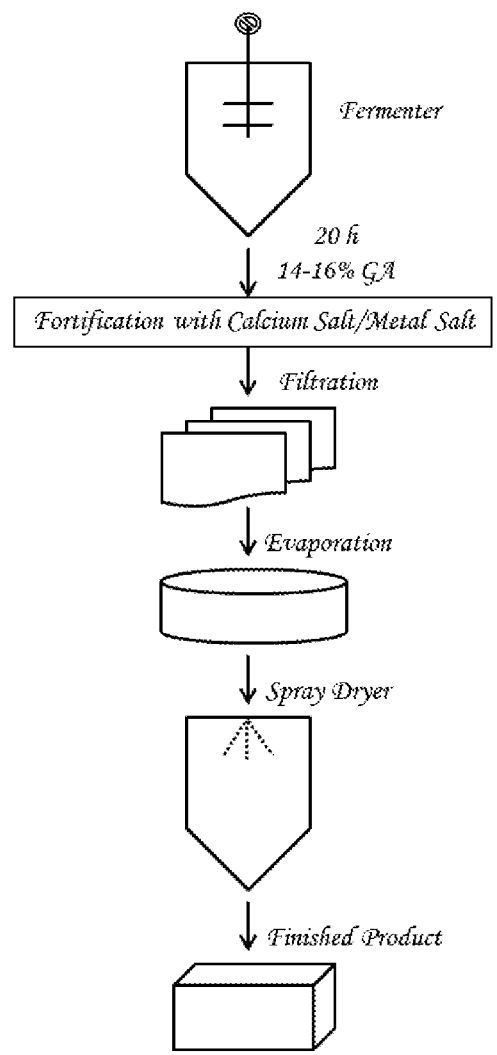
FIG. 1: The process flow diagram representing the Production of Natural Organic gluconic acid and gluconates.

The present invention discloses the conversion of non-edible grade organic maize or wheat into monosaccharides by enzyme hydrolysis, further their conversion to organic gluconic acid by microbial fermentation and subsequent methodology for fortification with different minerals like calcium, sodium, magnesium, and the iron to produce different natural organic gluconate salts was disclosed.

In one of the embodiment, the present invention relates to the "Production of Natural Organic Gluconates" by eco-friendly fermentation approach wherein carbohydrate sources obtained from enzymatic hydrolysis of non-edible grade organic maize or wheat with α-amylase and glucosidase. A microbial consortium of *Aspergillus* sp. and *Penicillium* spp. was developed for higher gluconic acid production with lower fermentation time.

Another embodiment of the present invention includes that the microbial consortia comprising of three lab-adapted strains *Aspergillus niger* NCIM 545, *Penicillium notatum* NCIM 745 and *Penicillium chrysogenum* NCIM 709 which were modified by way of strain improvement through media optimization experiments for product yield enhancement at the 'in house R&D section' of Prathista Industries Limited. These fungal cultures were initially obtained from National Collection for Industrially Important Microorganisms (NCIM), at National Chemical Laboratory, Pune and were further modified by way of strain improvement methods.

Another embodiment of the present invention relates to the main glucose source (14-16%) used in media for fermentation is naturally originated from organically grown plant sources like Maize and Wheat. The fermentation process was optimized with different media constituents and controlling parameters. The upstream process was completed when reducing sugars completely exhausted in the fermenter. The downstream process includes the leaf filtration of liquid for obtaining the liquid gluconic acid with 15%.

In another embodiment of the present invention the fortification of liquid gluconic acid with 25-50% $Ca(OH)_2$/$CaCO_3$ slurry for calcium gluconate or 25-50% of $Na_2CO_3$ slurry for sodium gluconate or 25-50% of $MgO$/$MgCO_3$ for magnesium gluconate or 25-50% of $FeO$/$FeCO_3$ for ferrous gluconate is disclosed. Downstream progression includes the evaporation and spray drying to obtain the desired concentration of natural organic gluconate salts in the powder form. This is a more acceptable and easy way to get the powder form of the organic gluconates by way of drying at 200° C. This is a sophisticated and improved process to enhance the yield of gluconate salts, decrease the time of production and improve the quality of the final product.

The present invention is further explained by the following examples. However, the present invention is not limited to these examples in any manner. The following examples are intended to illustrate the working of disclosure and not intended to take restrictively to apply any limitations on the scope of the present invention. Those persons skilled in the art will understand that the equivalent substitutes to the specific substances described herein, or the corresponding improvements are considered to be within the scope of the invention.

EXPERIMENTAL DETAILS & RESULTS

EXAMPLE 1

Upstream Process and Parameters

The non-edible grade organic maize or wheat grains were powdered in a pulverizer. The hydrolyzing reactor was cleaned properly and 100 L of demineralized water was filled and mixed with 20-22 Kg of flour. The pH of the slurry was adjusted to 6.5±0.1 and temperature was maintained at 80° C. α-amylase of 0.5% of raw material flour was added to the tank and incubated for 1 h.30 min, the further enzyme was inactivated by raising temperature to 100±5° C. for 30 min. In the second step, the reactor was cleaned and above slurry was maintained at 60° C. at the pH 4.5±0.1. Glucosidase enzyme of 0.5% of raw material flour was added to the slurry and incubated for 5 h to complete the hydrolysis process. Once the hydrolysis was finished temperature was raised to 90° C. for 30 min to inactivate the enzyme. The final hydrolysate was passed through the leaf filtrate assembly and the monosaccharides solution was collected. The concentration of produced monosaccharides was calculated through reducing sugars percentage and dextrose conversion rate.

Fungal cultures namely *Aspergillus niger* NCIM 545, *Penicillium notatum* NCIM 745 and *Penicillium chrysogenum* NCIM 709 were procured from NCIM, Pune. Different microbial consortium was developed and used for aerobic fermentation. Initially, spores of the respective culture were inoculated individually in the following media for germination. 15-16% glucose extract, 0.08 g/L yeast extract, 0.3 g/L potassium dihydrogen phosphate, 0.378 g/L di-potassium hydrogen phosphate, 0.15 g/L magnesium sulphate, Ammonium nitrate 1.2 g/L and Starch 0.6 g/L. Medium (without glucose Extract) was heat sterilized at 121° C. and 15 psi for 25 min in an autoclave. Glucose Extract was sterilized separately at 115° C. for 15 min and added aseptically to rest of the medium. Sterile air was flushed at 1-1.5 m3/m3 into the medium from the bottom of the reactor using a sterile 0.2 μm pore sized PTFE filter (Axiva® 200050 RI, AXIVA Sichem Biotech Pvt. Ltd., India), to maintain aerobic condition throughout this fermentation step. The pre-sterilized fermentation medium in the bioreactor was inoculated with 10% of inoculum from 24 hrs grown shaker flask culture. The seed culture was prepared in 500 mL Erlenmeyer flasks, incubated at 30° C. under shaking conditions in temperature controlled orbital shaker. Improvement of the strains was done in-house over a period.

The fermentation media having composition of 15-16% glucose extract, 0.08 g/L yeast extract, 0.3 g/L potassium dihydrogen phosphate, 0.378 g/L di-potassium hydrogen phosphate, 0.15 g/L magnesium sulphate, Ammonium nitrate 1.2 g/L and Starch 0.6 g/L. Medium (without glucose) was heat sterilized at 121° C. and 15 psi for 25 min. Glucose was autoclaved separately at 115° C. for 15 min and added aseptically to the rest of the medium. All fermentation studies were carried out in 50 L stirred-tank, Stainless Steel (S.S.) bioreactors. Fermentation was done in batch mode.

The process parameters were as follows:

| | |
|---|---|
| pH | 6.0 ± 0.5 |
| Temperature | 30 ± 2° C. |
| Agitation (RPM) | 100 |
| Air Pressure | 1-1.5 m3/m3 |

The temperature was controlled at 30° C., and pH was maintained at 6.0±0.5 using respective mineral salt. Temperature and pH were monitored using temperature and pH probe, respectively (Sartorius). The pre-sterilized fermentation medium in the bioreactor was inoculated with a 10% inoculum of 48 h grown static flask cultures. The seed cultures were prepared in 500 mL Erlenmeyer flasks, incubated at 30° C. The progress of one fermentation batch for "Production of Natural Organic Gluconates" is depicted in FIG. 1. After 15-20 hr. fermentation, complete glucose is consumed and salts of Gluconic acid concentration of 14-16% is achieved in the fermented broth.

Figure 2:
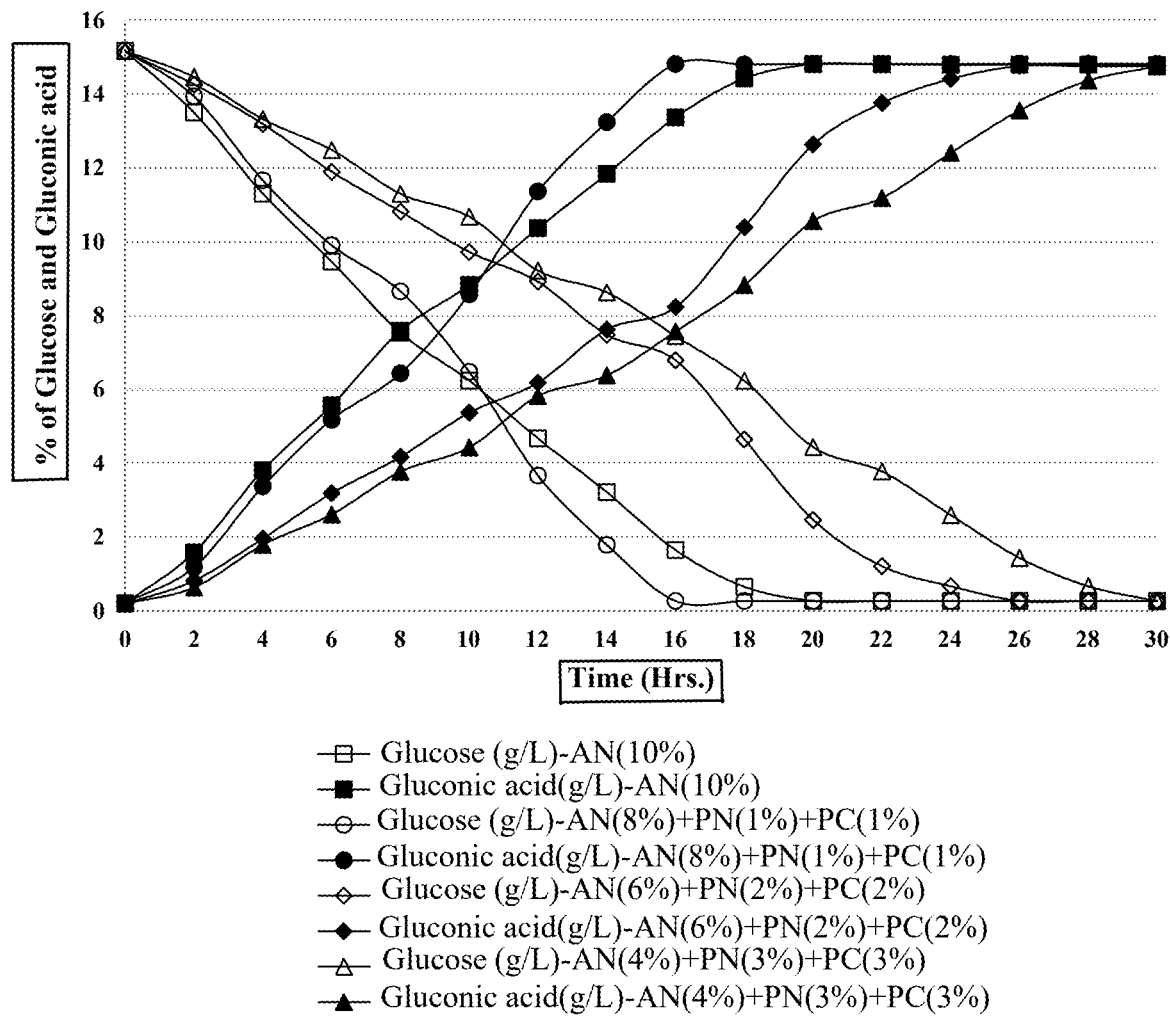
FIG. 2: Inoculum optimization in consortium effect on the yield.

Different proportions of the three active fungal cultures were checked for the development of high gluconic acid yield producing inoculum in the consortia. *Aspergillus niger* (AN) alone at 10% inoculum concentration was tested against different proportions of consortium. *Aspergillus niger* (AN), *Penicillium notatum* (PN), *Penicillium chrysogenum* (PC) at inoculums ratio of 8:1:1, 6:2:2 and 4:3:3 were checked. The glucose utilization ability of these cultures with respect to the time of fermentation to get high gluconic acid yield was checked. The AN:PN:PC at 8:1:1 ratio provided the highest gluconic acid yield with less time of around 16 h while AN alone showed the same yield at 20 h of fermentation. In the case of AN:PN:PC at 6:2:2 and 4:3:3 ratio where the *Penicillium* spp. the proportion increased the time taken for high yield also increased to 26 h and 30 h respectively (FIG. 2). Thus AN:PN:PC at 8:1:1 is ideal for the production of high concentration 14-16% of gluconic acid in 15 -20 h with the standardized media composition.

EXAMPLE 2

(a) In-Process Monitoring of Microbial Growth

Microbial growth during fermentation was measured in terms of fungal biomass. The fungal biomass was filtered through the Whatman No-1 filter paper and dried at 60° C. till constant weight was attained. The dry weight of fungal biomass was noted and gluconic acid yield was analyzed in the in-process and finished product samples by High-Performance Liquid Chromatography (HPLC) as explained in gluconic acid estimation.

(b) Downstream Processing and Product Recovery

The upstream process of maintaining the pH was used by 25-50% $Ca(OH)_2/CaCO_3$ slurry as a neutralizer and it was removed by using sulfuric acid treatment@3-4% to the 14-16% of gluconate broth to obtain the pure gluconic acid.

The upstream process of fermentation was neutralized with the mineral salt to maintain pH was performed through dosing with pre-sterilized 25-50% $Ca(OH)_2/CaCO_3$ slurry for calcium gluconate or 25-50% of $Na_2CO_3$ slurry for sodium gluconate or 25-50% of $MgO/MgCO_3$ for magnesium gluconate or 25-50% of $FeO/FeCO_3$ for ferrous gluconate enriched organic salts. As the maximal production of gluconic acid and complete utilization of glucose was achieved within 16 h of fermentation, a typical production batch was terminated between 15-20 h of fermentation. Further filtration was performed through 0.3 to 0.4-micron size cloth filters in a leaf filtration assembly. The filtered product was concentrated by evaporation and extraction of precipitates followed by homogenization with demineralized water at a high temperature of 95 to 100° C. The slurry was then subjected to spray drying process through the feed inlet at a temperature of 200° C. to obtain "Natural Organic Gluconates" with desired gluconic acid levels. The upstream and downstream process has been depicted as a flow chart in FIG. 1.

(c) Estimation of Gluconic Acid

Yield of the gluconic acid formed in gluconates was analyzed in the in-process samples as well as finished product samples by High-Performance Liquid Chromatography (HPLC) based method. The total gluconic acid present in the 0.1 g of the test sample was calculated by dissolving in 100 mL of the suitable solvent (8 mM of sulfuric acid in water as a mobile phase). Followed by 0.22 μm filtration and degassing was performed with the sonicator to prepare the test sample vials. These samples were analyzed with reference to analytic reference standards of respective organic acids.

Further samples are analyzed by injecting 20 μL of the prepared samples into the HPLC (Shimadzu LC2010CHT) system. Organic acids column (250×4.6 mm) was used by maintaining column temperature at 30° C. against 8 mM sulfuric acid in water mobile phase. The flow rate was maintained at 0.5 mL/min. while the total run time was 35 min. Detection was performed through UV/Vis at 215 nm.

The standards were injected using the same conditions at concentrations ranging from 2 mM to 20 mM to create a standard curve. Using a spreadsheet application the peak areas of the standards against their concentration were plotted. Further the slope and intercept of the least squares regression line were determined Checked the line for linearity and discarded the low or high points that are not linear. The test samples were ensured that their absorbance falls within the range of the linear standard concentrations.

Using the Shimadzu Lab Solutions Software, the concentration of respective organic acids in a test sample are determined with reference to the standard calibration curve of respective organic acids in terms of difference of sample peak area and the intercept of gradient of organic acids plotted against the slope of standard curve for each of the individual organic acids.

INDUSTRIAL APPLICABILITY OF THE INVENTION

The process of the present invention is a robust, simple and cost-effective in the production of gluconic acid and its salts by using biotechnological processes. The "Production of Natural Organic Gluconates" by fermentation with improved gluconic acid yield in less time can be useful for meeting the increased demand of gluconic acid and its salts in various sectors like pharma, food, textile, dairy, and construction industries. With a wide range of applications, gluconates produced organically and naturally in this process are eco-friendly and safe to use in food and pharma without any side effects.

REFERENCES CITED

Pal P, Kumar R, Banerjee S (2016) Manufacture of gluconic acid: A review towards process intensification for green production. Chemical Engineering and Processing 104, pp 160-171.

Ramachandran S, Nair S, Larroche C (2017) Gluconic acid. In: Current developments in biotechnology and bioengineering. Current Developments in Biotechnology and Bioengineering. Elsevier, Amsterdam, pp 577-599.

Chiang A, Bruze M, Fregert S, Gruvberger B (2012) Chemical Skin Burns. In: Rustemeyer T., Elsner P., John S M., Maibach H. I. (eds) Kanerva's Occupational Dermatology. Springer, Berlin, Heidelberg.

Sterns R H, Grieff M, Bernstein P L (2016) Treatment of hyperkalemia: something old, something new. Kidney Int, 89, pp. 546-554.

Ivušić F, Lahodny-Šarć O, Curkovic H O, Alar V (2015) Synergistic inhibition of carbon steel corrosion in seawater by cerium chloride and sodium gluconate, Corrosion Science, Volume 98, pp 88-97.

Humbert P, Przyklenk M, Vemmer M, Patel A V (2017) Calcium gluconate as cross-linker improves survival and shelf life of encapsulated and dried *Metarhizium brunneum* and *Saccharomyces cerevisiae* for the application as biological control agents, Journal of Microencapsulation, 34:1, pp 47-56.

Abendrot M and Kalinowska-Li U (2018) Zinc-containing compounds for personal care applications. International Journal of Cosmetic science 40, pp 319-327.

Carvalho A L F, Freitas D F S, Mariano D M et al. (2018) The influence of zinc gluconate as an intercalating agent on the structural, thermal, morphologic, and molecular mobility of lamellar nanofiller. Colloid Polym Sci 296: 1079.

Adhikar U, Rija N P, Khana S, Pa D, Sanka J, Bhattara N (2016) Magnesium incorporated chitosan based scaffolds for tissue engineering applications. Bioactive Materials Volume 1, Issue 2, pp 132-139.

Juan Xiong, Meihua Hu, Xiaoping Li, Hongying Li, Xin Li, Xiang Liu, Guozhong Cao and Weishan Li, (2018) Porous graphite: a facile synthesis from ferrous gluconate and excellent performance as anode electrocatalyst of microbial fuel cell, Biosensors and Bioelectronic, Volume 109, Pages 116-122.

EP0062027B1-Publication no. 0062027, Publication date: Jun. 10, 1982-Process for preparing monosaccharides and arrangement for carrying out the process.

We claim:

1. A process for producing one or more gluconate salts, comprising: fermenting monosaccharides including glucose using a microbial consortium of *Aspergillus niger* NCIM 545, *Penicillium notatum* NCIM 745 and *Penicillium chrysogenum* NCIM 709 in the ratio of 8:1:1, respectively, to produce liquid gluconic acid at a concentration of 14-16% by weight in about 16 hours, wherein the monosaccharides including glucose are produced by enzymatic hydrolysis of maize grain or wheat grain with alpha-amylase and glucosidase; and fortifying the liquid gluconic acid with one or more minerals selected from calcium, sodium, magnesium, and iron to produce one or more gluconate salts.

2. The process as claimed in claim 1, further comprising filtering and drying the one or more gluconate salts.

3. The process as claimed in claim 1, wherein the fermenting is carried out on media having a composition of 15-16% by weight glucose, 0.08 g/L yeast extract, 0.3 g/L potassium dihydrogen phosphate, 0.378 g/L di potassium hydrogen phosphate, 0.15 g/L magnesium sulphate, 1.2 g/L ammonium nitrate and 0.6 g/L starch.

4. The process as claimed in claim 3, wherein the media is heat sterilized at 121° C. and 15 psi for 25 min. in the absence of glucose, separately autoclaving the glucose at 115° C. for 15 min and then aseptically adding the sterilized glucose to the rest of the media.

5. The process as claimed in claim 1, wherein the fermenting is carried out in a bioreactor in batch mode at a temperature of 30±2° C., a pH 6.0±0.5, and agitation of 100 rpm.

6. The process as claimed in claim 5, wherein the batch is terminated between 15-20 hours of fermentation.

7. The process as claimed in claim 1, wherein the fermenting is completed when the monosaccharides are completely exhausted.

8. The process as claimed in claim 2, wherein the filtering is performed through a 0.3 to 0.4-micron size cloth filter in a leaf filtration assembly.

9. The process as claimed in claim 2, wherein the drying is performed by spray drying at 200° C. to obtain the one or more gluconate salts in a powder form.

10. The process as claimed in claim 2, wherein the filtering is performed by leaf filtration to obtain liquid gluconic acid with 14-16% concentration.

11. The process as claimed in claim 1, wherein the fortifying liquid gluconic acid is carried out with 25-50% of $Na_2CO_3$ slurry for sodium gluconate.

* * * * *